United States Patent
Weber et al.

(10) Patent No.: US 6,456,057 B1
(45) Date of Patent: Sep. 24, 2002

(54) UNIVERSAL BOOSTER AMPLIFIER FOR A CORIOLIS FLOWMETER

(75) Inventors: William Randolph Weber, Arvada; Kurtis Leroy McCormick, Longmont; Michael John Zolock, Berthoud, all of CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/706,918

(22) Filed: Nov. 6, 2000

(51) Int. Cl.[7] .................. G01R 23/12; G01R 19/22; G01F 1/84; G01F 1/00
(52) U.S. Cl. ............... 324/76.52; 324/120; 73/861.355; 702/45
(58) Field of Search ............... 324/76.52, 120; 73/668, 861.354, 861.355, 861.357; 331/65; 702/45

(56) References Cited

U.S. PATENT DOCUMENTS

| | | |
|---|---|---|
| RE31,450 E | 11/1983 | Smith |
| 4,491,025 A | 1/1985 | Smith et al. |
| 4,801,897 A * | 1/1989 | Flecken ........................ 331/65 |
| 5,239,257 A * | 8/1993 | Muller et al. .............. 324/71.1 |
| 6,233,526 B1 * | 5/2001 | Cunningham ................ 702/45 |
| 6,255,954 B1 * | 7/2001 | Brown et al. ............... 340/603 |

* cited by examiner

Primary Examiner—N. Le
Assistant Examiner—Anjan K. Deb
(74) Attorney, Agent, or Firm—Faegre & Benson LLP (57) ABSTRACT

A universal booster amplifier for a Coriolis flowmeter. The booster amplifier receives drive signals from a flowmeter electronics and extends conditioned drive signals to a driver for flow tubes of flowmeter sensor. The booster amplifier includes phase shift circuitry to provide improved drive signals for flowmeters having curved and straight flow tube geometries. The booster amplifier includes offline switching power circuitry which operates on a plurality of standard AC voltages. The booster amplifier combines environmentally innocuous housing and barrier circuitry to meet numerous regulatory agency safety standards for operating environments including explosive environments and increase the ease of installation and service of the booster amplifier.

13 Claims, 5 Drawing Sheets

UNIVERSAL BOOSTER AMPLIFIER FOR A CORIOLIS FLOWMETER

FIELD OF INVENTION

This invention relates to a Coriolis flowmeter that has a booster amplifier for increasing the power of the drive signals transmitted from a flowmeter electronics to a flowmeter sensor. More particularly, this invention relates to a booster amplifier which is operable with flowmeter sensors having flow tubes of straight and curved geometries, on numerous electrical voltage standards and under various environmental conditions.

PROBLEM

It is known to use Coriolis mass flowmeters to measure mass flow and other information with respect to materials flowing through a pipeline as disclosed in U.S. Pat. No. 4,491,025 issued to J. E. Smith, et al., of Jan. 1, 1985 and Re. 31,450 to J. E. Smith of Feb. 11, 1982. These flowmeters typically comprise a flowmeter electronics portion and a flowmeter sensor portion. Flowmeter sensors have one or more flow tubes of a straight or curved configuration. Each flow tube configuration has a set of natural vibration modes, which may be of a simple bending, torsional, radial or coupled type. Each flow tube is driven to oscillate at resonance in one of these natural modes. The natural vibration modes of the vibrating, material filled systems are defined in part by the combined mass of the flow tubes and the material within the flow tubes. Material flows into the flowmeter sensor from a connected pipeline on the inlet side of the flowmeter sensor. The material is then directed through the flow tubes and exits the flowmeter sensor to a pipeline connected on the outlet side of the flowmeter sensor.

Flowmeter sensors typically include a driver for applying vibrational force to the flow tubes. The driver receives a drive signal from the flowmeter electronics and induces resonant vibration of the flow tubes. The frequency of the drive signals for a flowmeter sensor having a flow tube of a straight configuration can differ significantly from those of a flowmeter sensor having flow tubes of a curved configuration.

When there is no material flowing through a flowmeter sensor, all points along the flow tubes oscillate with a substantially identical phase. As material flows through the flow tubes, Coriolis accelerations cause points along the flow tubes to have a different phase. The phase on the inlet side of the flowmeter sensor lags the driver, while the phase on the outlet side of the flowmeter sensor leads the driver.

Flowmeter sensors typically include two pick-offs for producing sinusoidal signals representative of the motion of the flow tubes at different points along the flow tubes. A phase difference of the sinusoidal signals received from the pick-offs is calculated by the flowmeter electronics. The phase difference between the pick-off signals is proportional to the mass flow rate of the material flowing through the flowmeter sensor.

One of the pick-off signals is also used to form a drive signal control loop. The natural vibration modes of the vibrating, material filled system is defined in part by the combined mass of the flow tubes and the material within the flow tubes. Changes in the tube wall thickness, tube vibrational stiffness or mass of the material within the flow tube may require modified drive signals to induce resonant vibration. A drive control loop allows the flowmeter electronics to continuously generate drive signals that induce resonant vibration of the flow tubes.

Flowmeter sensors are typically sized according to a range of material flow rates appropriate for the flowmeter sensor. In order to increase the material flow rate, larger flow tubes may be utilized. Increases in flow tube size may increase certain flow tube parameters such as tube wall thickness and vibrational stiffness. The drive signal received from the flowmeter electronics may require additional power in order for the driver to induce resonant vibration of the larger flow tubes. A booster amplifier can be used to increase the power of the drive signals received from the flowmeter electronics.

A flowmeter sensor and a flowmeter electronics are typically interconnected by nine leads along a single path. Where the flowmeter electronics is remotely mounted from the flowmeter sensor, a 9-wire cable may be used. Where the flowmeter electronics is integrally mounted to the flowmeter sensor, a 9-pin feed-through may be used. Of the nine leads, two connect the flowmeter electronics to the driver, two connect the flowmeter electronics to one pick-off, two connect the flowmeter electronics to another pick-off, and three connect the flowmeter electronics to the temperature sensor. A booster amplifier is typically inserted along the single path interconnecting the flowmeter electronics and the flowmeter sensor.

It is a problem to design a booster amplifier that can operate on multiple AC voltage standards. Coriolis flowmeters are used worldwide. Individual countries and regions have standardized on certain electrical voltage levels. For example, the 115 volt AC standard is common throughout the United States, the 100 volt AC standard is common throughout Japan, and the 230 volt AC standard is common throughout Europe.

A traditional approach to designing booster amplifiers for Coriolis flowmeters has been to create separate booster amplifier models for each voltage standard. However as the matrix of booster amplifiers grows, the number of parts which must be specified, purchased and inventoried increases, manufacturing and labor costs increase through process complexity, and finished product inventories increase.

A further problem is designing a booster amplifier that is capable of amplifying drive signals for straight and curved flow tube geometries. The drive signals for a flowmeter sensor having flow tubes of a curved configuration can require a drive frequency approximating 40 Hz. The drive signal for a flowmeter sensor having a flow tube of a straight configuration can require a drive frequency approximating 800 Hz. As the frequency of the resonant vibration of the flow tubes increases, inaccuracies in the drive system become magnified resulting in mass flow measurement error.

A traditional approach to designing booster amplifiers for flow tubes requiring higher frequency drive signals has been to increase the power of the drive signal. However, power sources providing standard AC voltage may not enable sufficient power to be imparted to the drive signal. Examples of standard AC voltages are the 115 volt AC standard common throughout the United States, the 100 volt AC standard common throughout Japan, and the 230 volt AC standard common throughout Europe.

A further problem is designing a booster amplifier that meets regulatory agency safety standards for explosive environments. Coriolis flowmeters are used in various environments, ranging from inert to explosive. As the operating environment for the flowmeter becomes more severe, increasingly stringent requirements must be met by the flowmeter. Individual countries and regions have standardized flowmeter safety requirements through regulatory agencies. For example, UL determines flowmeter safety requirements in the United States, CENELEC determines flowmeter safety requirements in Europe, CSA determines flowmeter safety requirements in Canada and TIIS determines flowmeter safety requirements in Japan. A booster amplifier designed to meet an agency's safety requirements for an explosive environment will typically meet that agency's requirements for less severe environments. However, a booster amplifier meeting an agency's safety requirements for an explosive environment may not meet another agency's standards for an explosive environment. For purposes of this discussion, an explosive environment is an environment that includes a volatile material which can be ignited if a spark, excessive heat, or excessive energy is introduced to the environment.

One approach to meeting flowmeter safety requirements for an explosive environment is to encase the booster amplifier in an explosion proof housing. Methods used to achieve an explosion proof housing include encapsulation, pressurization and flame proof containment. An explosion proof housing prevents volatile material within the environment from contacting the device where heated surfaces of the device or sparks from circuitry in the device may cause an ignition of the volatile material. An explosion proof housing may also provide a flame path of sufficient length to cool any internal ignition prior to contact with volatile material external to the housing. Another approach to meeting flowmeter safety requirements for an explosive environment is to make the booster amplifier intrinsically safe. An intrinsically safe device is a device in which all of the circuitry in the device operate at certain low energy levels. By operating at low energy levels, the device cannot generate a spark or sufficient heat to cause an explosion.

A traditional approach to designing booster amplifiers for Coriolis flowmeters has been to create separate booster amplifier models for each operating environment subject to differing regulatory agency safety standards. However as the matrix of booster amplifiers grows, the number of parts which must be specified, purchased and inventoried increases, manufacturing and labor costs increase through process complexity, and finished product inventories increase.

A further problem is designing a booster amplifier that meets regulatory agency safety standards for explosive environments which is easy to service and install. A booster amplifier designed to meet regulatory agency safety standards for explosive environments can include complex installation and service requirements. Booster amplifiers can include an installation requirement for a separate earth ground and assemblies which must be replaced upon service of the booster amplifier in order to meet flowmeter safety requirements for explosive environments.

A booster amplifier strictly includes all of the conductors, circuitry and housing necessary to receive the drive signal from a flowmeter electronics, amplify the drive signal, and send the drive signal to the flowmeter sensor. However, flowmeter electronics typically send to and receive from the flowmeter sensor all signals necessary in the operation of the flowmeter through a single path. Therefore for purposes of this discussion, a booster amplifier may also include all of the conductors and housing necessary for sending to and receiving from the flowmeter sensor additional signals where the path from the flowmeter electronics used for the drive signal includes additional signals.

SOLUTION

The above and other problems are solved and an advance in the art is made by a booster amplifier provided in accordance with this invention. A first advantage of this invention is that the booster amplifier can operate with a plurality of electrical voltages. A second advantage of this invention is the capability of the booster amplifier to amplify drive signals for straight and curved flow tube geometries. A third advantage of this invention is that the booster amplifier meets numerous regulatory agency safety standards for explosive environments. A fourth advantage of this invention is ease of service and installation of the booster amplifier.

The booster amplifier provided in accordance with the present invention is operable with a plurality of different standard voltages through the use of offline switching power circuitry. Examples of standard voltages are the 115 volt AC common throughout the United States, the 100 volt AC common throughout Japan, and the 230 volt AC common throughout Europe. Offline switching power circuitry receives an AC voltage from a power source, rectifies the AC voltage to a corresponding DC voltage and converts the corresponding DC voltage to a single uniform DC voltage. The drive circuitry operates on the single uniform DC voltage output by the offline switching power circuitry.

The booster amplifier provided in accordance with the present invention amplifies the drive signals for straight and curved flow tube geometries. The drive signals for a flowmeter sensor having flow tubes of a curved configuration can require a drive frequency approximating 40 Hz. The drive signal for a flowmeter sensor having a flow tube of a straight configuration can require a drive frequency approximating 800 Hz. As the frequency of the resonant vibration of the flow tubes increases, the phase of the drive signal must be more precise in order to efficiently induce resonant vibration of the flow tubes. Phase shift circuitry modifies the phase of the drive signal received from the flowmeter electronics to efficiently induce resonant vibration of the flow tubes.

The booster amplifier provided in accordance with the present invention meets numerous regulatory agency safety standards for explosive environments. Examples of regulatory agencies setting flowmeter safety requirements for explosive environments are UL in the United States, CENELEC in Europe, CSA in Canada and TIIS in Japan. The booster amplifier provided in accordance with the present invention meets regulatory safety standards for explosive environments through the use of barrier circuitry and environmentally innocuous housing. Environmentally innocuous housing uses a plurality of explosion proof housing techniques in order to meet regulatory safety standards for explosive environments, including explosion proof encasement and flame path containment.

In order to amplify the drive signal received from the flowmeter electronics, the booster amplifier utilizes power in excess of the intrinsically safe threshold. The housing for the portions of the booster amplifier having non-intrinsically safe conductors or circuitry utilize explosion proof encasement techniques to meet regulatory safety standards for explosive environments.

In order to avoid using explosion proof encasement techniques for the entire booster amplifier, the portions of the booster amplifier having non-intrinsically safe conductors or circuitry are isolated from the remainder of the booster amplifier. Barrier circuitry isolates the non-intrinsically safe conductors and circuitry from intrinsically safe circuitry or conductors. Barrier circuitry prevents the power in excess of the intrinsically safe threshold from being transferred from the non-intrinsically safe circuitry to the drive signal received from the flowmeter electronics during operation of the booster amplifier and in the event of a short. The housing for the barrier protected intrinsically safe conductors adjacent to the portion of the booster amplifier containing non-intrinsically safe circuitry or conductors utilize flame path containment techniques to meet regulatory agency standards for explosive environments. Flame path containment techniques provide a flame path of sufficient length to cool any internal ignition prior to contact with volatile material external to the housing.

Environmentally innocuous housing may include an interface housing component, a drive circuitry housing component, and an amplified drive signal conduit component. However, flowmeter electronics typically send to and receive from the flowmeter sensor all signals necessary in the operation of the flowmeter through a single path. Therefore, the environmentally innocuous housing may also include a non-drive signal conduit component. The non-drive signal conduit component provides housing from the interface housing component to the flowmeter sensor for any additional signals received over the path which included the drive signal.

The interface housing component receives the drive signal from the flowmeter electronics. The interface housing component serves as a junction for the drive and other signals received over the path which included the drive signal, as a mounting bracket for the booster amplifier, and as a receptacle for the terminus of the flowmeter electronics. The interface housing component provides a flame path between the interface housing component and the drive circuitry housing component. The interface housing component utilizes flame path containment techniques to meet regulatory agency standards for explosive environments.

The drive circuitry housing component houses the barrier circuitry, the phase shift circuitry, the offline switching power circuitry, and the drive circuitry. The drive circuitry housing component is connected to the interface housing component and the amplified drive signal conduit component. The drive circuitry housing component receives the drive signal from the interface housing component and a standard voltage from the customer supplied power source. The circuitry and conductors housed within the drive circuitry housing component may exceed the intrinsically safe threshold. The drive circuitry housing component utilizes explosion proof encasement techniques meeting regulatory agency standards for explosive environments.

The amplified drive signal conduit component houses the amplified drive signal. The amplified drive signal conduit component is connected to the drive circuitry housing component and the flowmeter sensor. The circuitry and conductors housed within the amplified drive signal conduit component may exceed the intrinsically safe threshold. The amplified drive signal conduit component utilizes explosion proof encasement techniques meeting regulatory agency standards for explosive environments.

Flowmeter electronics typically send to and receive from the flowmeter sensor all signals necessary in the operation of the flowmeter through a single path. Therefore, the environmentally innocuous housing may also include a non-drive signal conduit component. The non-drive signal conduit component provides housing from the interface housing component to the flowmeter sensor for any additional signals received over the path which included the drive signal. As the non-drive signal conduit component does not contain non-intrinsically safe conductors or circuitry and is not adjacent housing containing non-intrinsically safe conductors or circuitry, explosion proof housing techniques are not necessary in order to meet regulatory agency standards for explosive environments.

The booster amplifier provided in accordance with the present invention increases ease of service and installation. Barrier circuitry may comprise galvanic isolation device circuitry (GID). The GID eliminates the need for a separate earth ground for the barrier circuitry. The elimination of a separate earth ground reduces cost and increases ease of use and installation for the customer. The amplified drive signal conduit component may include first and second connector members and a conduit member allowing disassembly and reuse of the amplified drive signal conduit component. Disassembly and reuse of the amplified drive signal conduit component increases ease with which the booster amplifier can be serviced.

BRIEF DESCRIPTION OF THE DRAWINGS

The above and other advantages of this invention may be more readily understood upon a reading of the Detailed Description thereof taken in conjunction with the following drawings.

DETAILED DESCRIPTION

Preferred embodiments of the present invention will now be described more fully hereinafter with reference to the accompanying drawings. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 1:
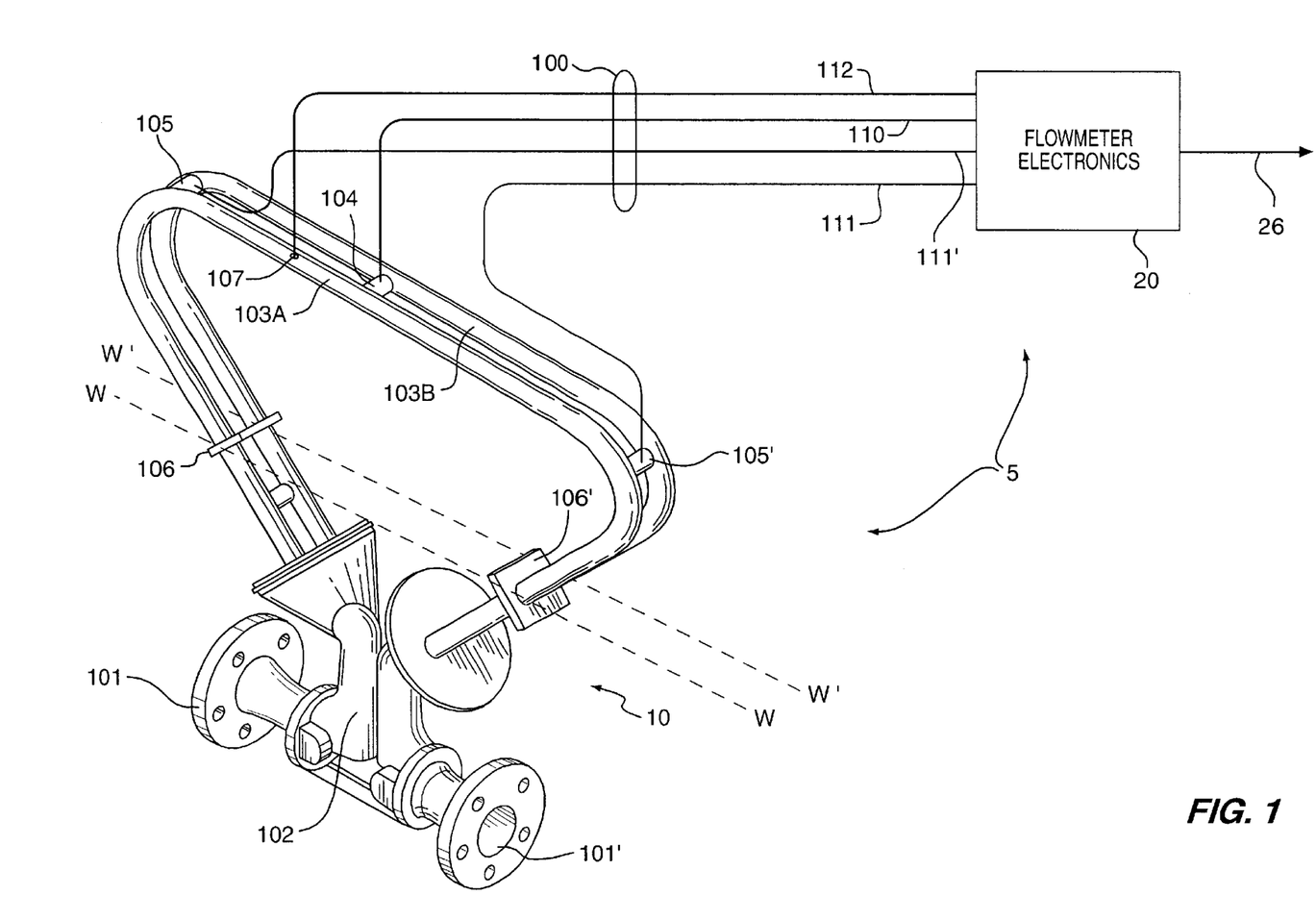
FIG. 1 illustrating a Coriolis flowmeter sensor and electronics.

FIG. 1 shows an exemplary Coriolis flowmeter 5 comprising a Coriolis flowmeter sensor 10 and a Coriolis flowmeter electronics 20. Flowmeter electronics 20 is connected to flowmeter sensor 10 via path 100 to provide for example, but not limited to, density, mass flow rate, volume flow rate and totalized mass flow information over path 26. A Coriolis flowmeter structure is described although it should be apparent to those skilled in the art that the present invention could be practiced in conjunction with any apparatus having a vibrating flow tube to measure properties of material flowing through the flow tube. A second example of such an apparatus is a vibrating tube densitometer which does not have the additional measurement capability provided by a Coriolis mass flowmeter.

Flowmeter sensor 10 includes a pair of flanges 101 and 101', manifold 102 and flow tubes 103A and 103B. Connected to flow tubes 103A and 103B are driver 104 and pick-off sensors 105 and 105', and temperature sensor 107. Brace bars 106 and 106' serve to define the axis W and W' about which each flow tube oscillates.

When flowmeter sensor 10 is inserted into a pipeline system (not shown) which carries the process material that is being measured, material enters flowmeter sensor 10 through flange 101, passes through manifold 102 where the material is directed to enter flow tubes 103A and 103B, flows through flow tubes 103A and 103B and back into manifold 102 from where it exits flowmeter sensor 10 through flange 101'.

Flow tubes 103A and 103B are selected and appropriately mounted to the manifold 102 so as to have substantially the same mass distribution, moments of inertia and elastic modules about bending axes W—W and W'—W', respectively. The flow tubes 103A–103B extend outwardly from the manifold in an essentially parallel fashion.

Flow tubes 103A–103B are driven by driver 104 in opposite directions about their respective bending axes W and W' and at what is termed the first out of phase bending mode of the flowmeter. Driver 104 may comprise any one of many well known arrangements, such as a magnet mounted to flow tube 103A and an opposing coil mounted to flow tube 103B and through which an alternating current is passed for vibrating both flow tubes. A suitable drive signal is applied by flowmeter electronics 20, via lead 110, to driver 104.

Pick-off sensors 105 and 105' are affixed to at least one of flow tubes 103A and 103B on opposing ends of the flow tube to measure oscillation of the flow tubes. As flow tubes 103A–103B vibrate, pick-off sensors 105–105' generate a first and a second pick-off signal. The first and second pick-off signals are applied to leads 111 and 111'.

Temperature sensor 107 is affixed to at least one of flow tubes 103A and 103B. Temperature sensor 107 measures the temperature of the flow tube in order to modify equations for the temperature of the system. Path 112 carries temperature signals from temperature sensor 107 to flowmeter electronics 20.

Flowmeter electronics 20 receives the first and second pick-off signals appearing on leads 111 and 111', respectively. Flowmeter electronics 20 processes the first and second pick-off signals to compute the mass flow rate, the density, or other property of the material passing through flowmeter sensor 10. This computed information is applied by meter electronics 20 over path 26 to a utilization means (not shown).

It is known to those skilled in the art that Coriolis flowmeter 5 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the flow tube to vibrate. Vibrating tube densitometers typically utilize only a single feedback signal since a density measurement requires only the measurement of frequency and a phase measurement is not necessary. The descriptions of the present invention herein apply equally to vibrating tube densitometers.

Figure 2:
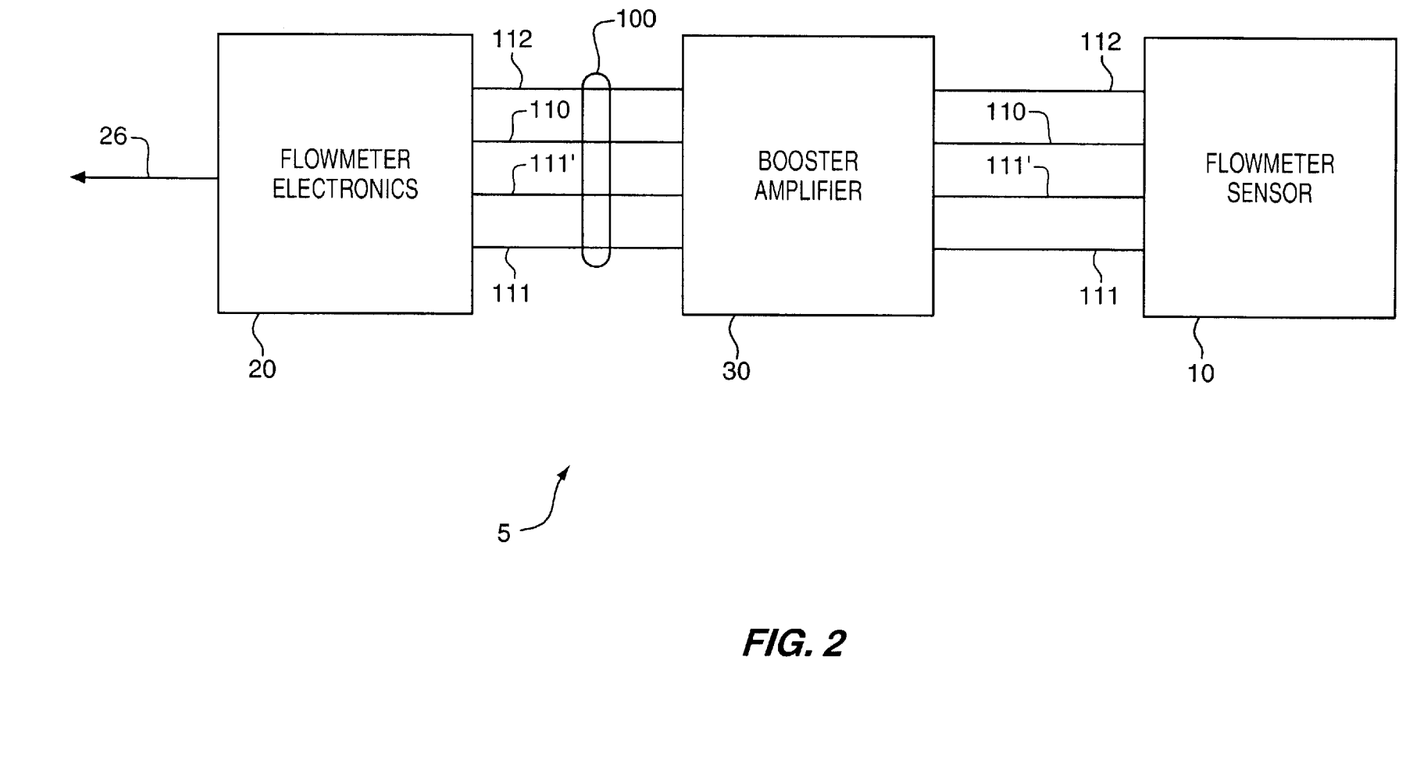
FIG. 2 illustrating a simplified block diagram of a Coriolis flowmeter with a booster amplifier.

FIG. 2 shows a simplified block diagram of a Coriolis flowmeter 5 having a flowmeter electronics 20, a flowmeter sensor 10 and a booster amplifier 30. Booster amplifier 30 amplifies the drive signal 110 generated by flowmeter electronics 20 to cause driver 104 to induce resonant vibration of flow tubes 103A and 103B (FIG. 1) of flowmeter sensor 10. Flowmeter electronics 20 is connected to booster amplifier 30 which is connected to flowmeter sensor 10. Booster amplifier 30 may be integrally mounted to flowmeter electronics 20, or to flowmeter sensor 10. Booster amplifier 30 may alternatively be integrally mounted to both flowmeter electronics 20 and flowmeter sensor 10.

Figure 3:
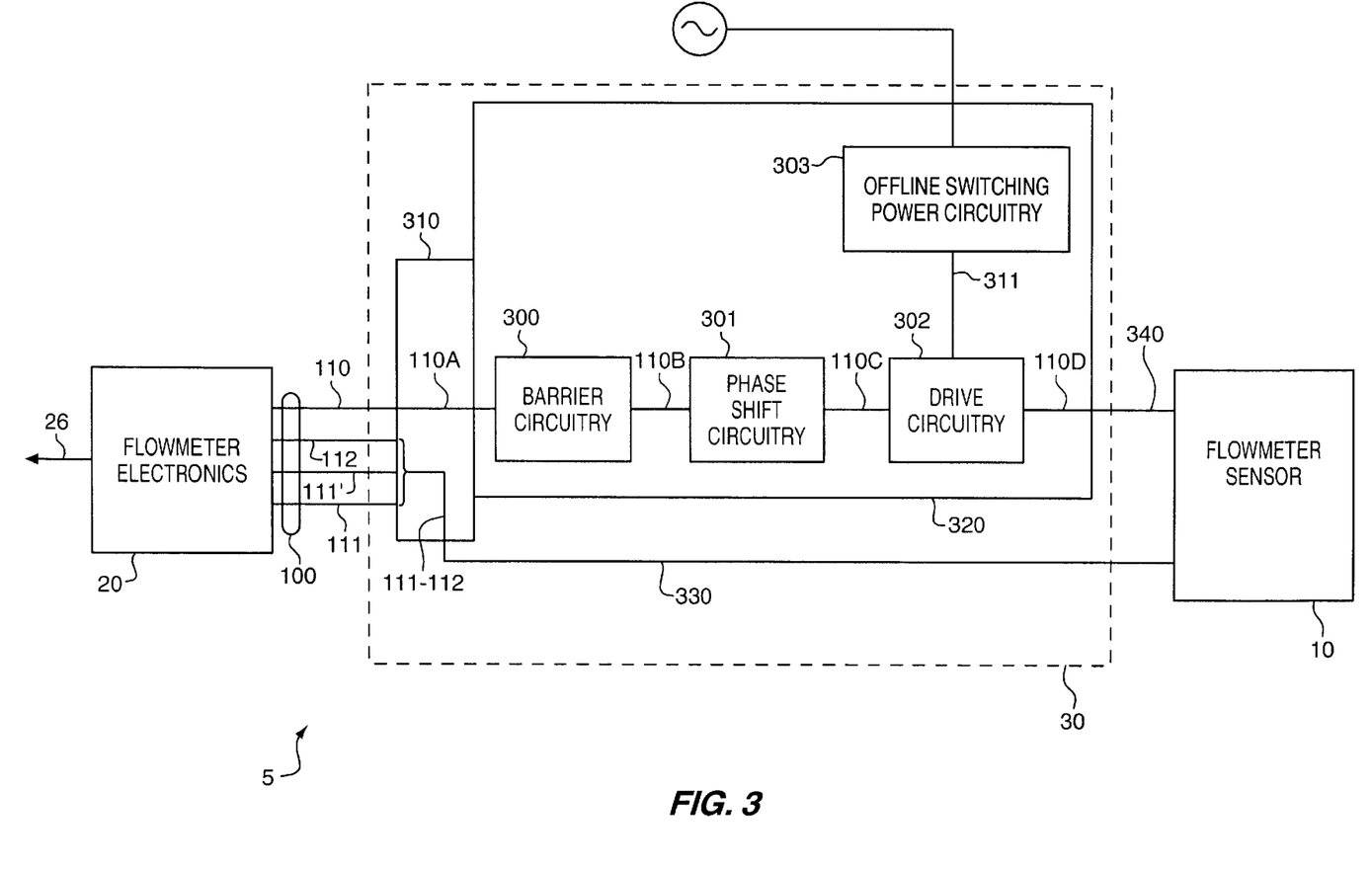
FIG. 3 illustrating a block diagram of a Coriolis flowmeter with a booster amplifier provided in accordance with the present invention.

FIG. 3 illustrates further detail of a preferred embodiment of the present invention. In this embodiment booster amplifier 30 is operable under numerous electrical voltage standards. In this embodiment booster amplifier 30 amplifies drive signals for both straight and curved flow tube geometries. In this embodiment booster amplifier 30 is compliant with numerous regulatory agency safety standards for explosive environments. This embodiment enables booster amplifier 30 to have increased ease of service and installation. Therefore, booster amplifier 30 can be used in applications where multiple booster amplifiers would have otherwise been necessary.

FIG. 3 illustrates housing and circuitry. Phase shift circuitry 301, drive circuitry 302 and offline switching power circuitry 303 cooperate to amplify drive signal 110. Barrier circuitry 300, interface housing component 310, drive circuitry housing component 320, non-drive signal conduit component 330, and amplified drive signal conduit component 340 cooperate to meet regulatory safety standards for explosive environments. More specifically, barrier circuitry 300, interface housing component 310, drive circuitry housing component 320, non-drive signal conduit component 330, and amplified drive signal conduit component 340 cooperate to limit the power transfer and internal ignition transfer from one housing component to another to meet regulatory safety standards for explosive environments.

Drive circuitry housing component 320 houses barrier circuitry 300, phase shift circuitry 301, drive circuitry 302 and offline switching power circuitry 303. Power levels within drive circuitry housing component 320 can exceed the intrinsically safe threshold, therefore drive circuitry housing component 320 utilizes explosion proof encasement techniques to meet regulatory safety standards for explosive environments.

Amplified drive signal conduit component 340 houses amplified drive signal 110D from drive signal housing component 320 to flowmeter sensor 10. Amplified drive signal 110D can exceed the intrinsically safe threshold, therefore amplified drive signal conduit component 340 utilizes explosion proof encasement techniques meeting regulatory agency standards for explosive environments.

Interface housing component 310 houses intrinsically safe signals, drive signal 110A, first and second pick-off signals 111 and 111', and temperature signal 112. Barrier circuitry 300 prevents power in excess of the intrinsically safe threshold from being transferred from the non-intrinsically safe circuitry within drive circuitry housing component 320 to drive signal 100A within interface housing component 310 during operation of the booster amplifier and in the event of a short. Drive signal housing component 320 contains circuitry which can exceed the intrinsically safe threshold, therefore interface housing component 310 utilizes flame path containment techniques to meet regulatory safety standards for explosive environments.

Non-drive signal conduit component 330 houses first and second pick-off signals 111 and 111', and temperature signal 112 between interface housing component 310 and flowmeter sensor 10. Non-drive signal conduit component 330 houses intrinsically safe conductors and is connected to housing component 310 and flowmeter sensor 10, both utilizing flame path containment techniques to meet regulatory safety standards for explosive environments, therefore non-drive signal conduit component 330 does not require flame path containment or explosion proof containment techniques to meet regulatory safety standards for explosive environments.

In operation, flowmeter electronics 20 applies signals over path 100 to booster amplifier 30. The signals on path 100 must include the drive signal and may include a temperature signal and first and second pick-off signals. The signals on path 100 are received by interface housing component 310 of booster amplifier 30. Interface housing component 310 provides a junction for the separation of the drive signal from other signals received over path 100. The drive signal is extended from interface housing component 310 to barrier circuitry 300 housed in drive circuitry housing component 320 of booster amplifier 30.

Drive circuitry housing component 320 houses barrier circuitry 300, phase shift circuitry 301, drive circuitry 302 and offline switching power circuitry 303. Drive circuitry housing component 320 provides an explosion proof housing for operation in an explosive environment. Drive circuitry housing component 320 includes circuitry operating at power levels that exceed the intrinsically safe threshold. Barrier circuitry 300 provides a barrier preventing power in excess of the intrinsically safe threshold from being transferred from circuitry within drive circuitry housing component 320 to drive signal 110A opposite barrier circuitry 300. Barrier circuitry can take the form of galvanic isolation device circuitry which eliminates the need for a separate earth ground for barrier circuitry 300. The details of barrier circuitry 301 are well known to those skilled in the art and do not form part of the present invention.

The temperature signal 112 and first and second pick-off signals 111 and 111' received by interface housing component 310 are extended from interface housing component 310 to flowmeter sensor 10 by non-drive signal conduit component 330 of booster amplifier 30. Interface housing component 310 provides a flame path sufficient to cool any ignition internal to drive circuitry housing component 320 prior to contacting volatile material within the environment external to booster amplifier 30. Non-drive signal conduit component 330 does not require flame path containment or explosion proof encasement techniques due to the flame path established by interface housing component 310 and the presence of only intrinsically safe signals within non-drive signal housing component 330.

Booster amplifier 30 includes phase shift circuitry 301. Phase shift circuitry 301 shifts the phase of the drive signal 110B from barrier circuitry 300 to produce drive signal 110C capable of more efficiently inducing resonant vibration of flow tubes 103A and 103B (not shown). Phase shift circuitry 301 corrects inaccuracies in the flowmeter drive system producing a more efficient and accurate drive signal. An example of an inaccuracy in the drive system is the inherent variation in the force applied by a given driver model in response to an identical drive signal. Phase shift circuitry 301 induces an experimentally determined phase shift in drive signal 110B. The phase shift induced in drive signal 110B can be manually selected in phase circuitry 301 for a given Coriolis flowmeter or can involve an automated process for determining the appropriate shift to apply to drive signal 110B for a given Coriolis flowmeter. The frequencies of drive signals for Coriolis flowmeters currently range from approximately 30 to 800 Hz. However phase shift circuitry is not limited to a specific range of drive signal frequencies to which the phase can be shifted. The details of phase shift circuitry 301 are well known to those skilled in the art and do not form part of the present invention. Phase shift circuitry 301 operates to output drive signal 110C to drive circuitry 302. Phase shift circuitry enables booster amplifier 30 to work with drive signals for flowmeters having straight and curved flow tube geometries.

Booster amplifier 30 requires a customer supplied power source. Booster amplifier 30 includes offline switching power circuitry 303 for receiving one of a plurality of different standard voltages from the customer supplied power source and outputting a single uniform DC voltage 311 to drive circuitry 302. Examples of standard voltages are the 115 volt AC common throughout the United States, the 100 volt AC common throughout Japan, and the 230 volt AC common throughout Europe. Offline switching power circuitry 303 receives an AC voltage in a range 85 to 265 volts AC to accommodate typical variations in the standard voltage supplied by the customer provided power source. Offline switching power circuitry enables booster amplifier 30 to be operated on numerous standard voltages.

Drive circuitry 302 increases the power of drive signal 110C from phase shift circuitry 301 to produce drive signal 110D having increased power for driver 104 (FIG. 1) to induce resonant vibration in flow tubes 103A and 103B. The amount of power added to drive signal 110C by drive circuitry 302 is controlled in a well known manner via the drive control loop (not shown) until flow tubes 103A and 103B vibrate at their resonant frequency. The details of drive circuitry 302 are well known to those skilled in the art and do not form a part of the present invention.

Drive signal 110D output from drive circuitry 302 is extended to flowmeter sensor 10 by amplified drive signal conduit component 340. Amplified drive signal conduit component 340 provides explosion proof encasement of drive signal 110D between drive circuitry housing component 320 and flowmeter sensor 10 meeting explosion proof housing requirements for operation in an explosive environment.

Figure 4:
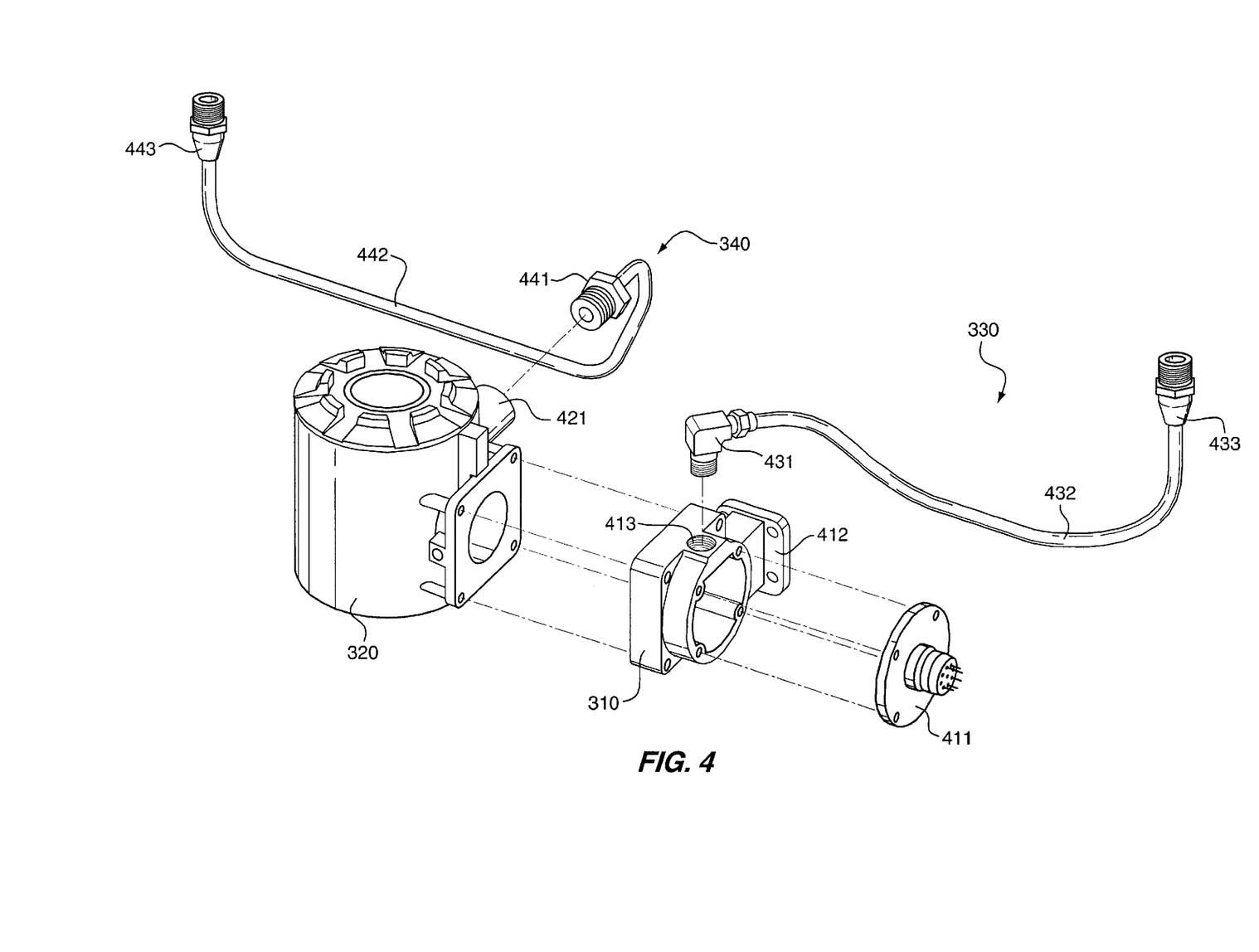
FIG. 4 illustrating an exploded view of the booster amplifier of a preferred embodiment provided in accordance with the present invention.

FIG. 4 illustrates an exploded view of a preferred embodiment of the components of the environmentally innocuous housing illustrated in FIG. 3, interface housing component 310, drive circuitry housing component 320, non-drive signal conduit component 330 and drive signal conduit component 340, in accordance with the present invention. This embodiment shows further detail of the environmentally innocuous housing of booster amplifier 30 illustrated in FIG. 3.

Interface housing component 310 includes an interface housing component input 411 adapted to receive drive and additional signals from flowmeter electronics 20 over path 100 (FIG. 1). Interface housing component 310 may include an integral mounting bracket 412. Integral mounting bracket 412 enables mounting of booster amplifier 30. Interface housing component 310 may also include interface housing component output 413 for receiving non-drive signal conduit component 330. Interface housing component 310 is mounted to drive circuitry housing component 320.

Non-drive signal conduit component 330 includes a first connector 431, a conduit 432 and second connector 433. Connector 431 is adapted to engage interface housing component output 413. Connector 431 is connected to a first end of conduit 432. A second end of conduit 432 is connected to second connector 433. Second connector 433 connects to flowmeter sensor 10. Non-drive conduit component 330 provides housing for temperature signal 112 and first and second pick-off signals 111 and 111' (FIG. 3).

Drive circuitry housing component 320 includes drive circuitry housing component output 421 for receiving amplified drive signal conduit component 340. Amplified drive signal conduit component 340 includes a first connector 441, a conduit 442 and second connector 443. Connector 441 is adapted to engage drive circuitry housing component output 421. Connector 441 is connected to a first end of conduit 442. A second end of conduit 442 is connected to second connector 443. Second connector 443 connects to flowmeter sensor 10. Amplified drive signal conduit component 340 provides explosion proof housing for drive signal 110D from the drive circuitry housing component 320 to flowmeter sensor 10 (FIG. 3).

Figure 5:
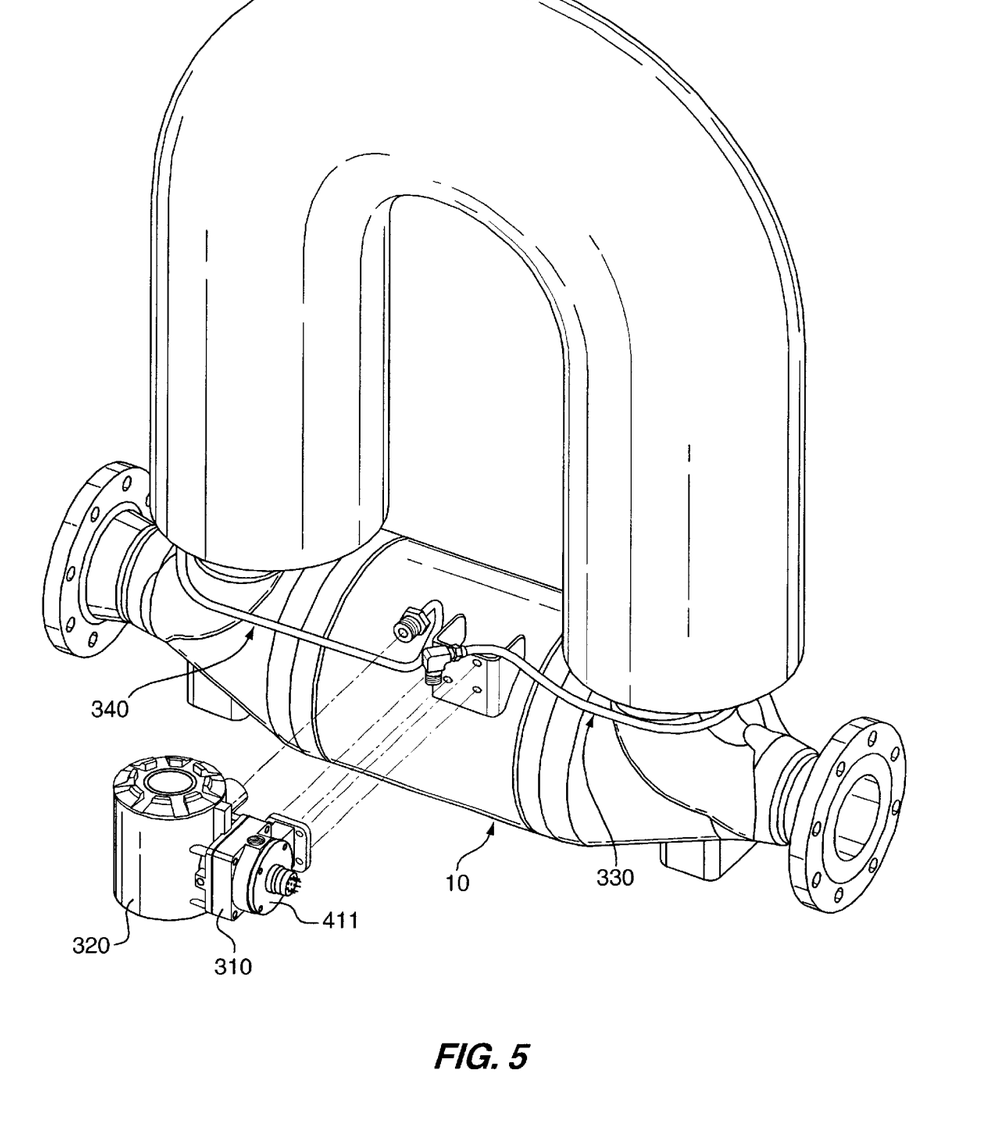
FIG. 5 illustrating a fully assembled view of the booster amplifier of a preferred embodiment provided in accordance with the present invention

Amplified drive signal conduit component 340 provides increased ease of service for booster amplifier 30. Connector 441, conduit 442 and connector 443 enable disassembly and reuse of amplified drive signal conduit component 340. At each connection, connector 441 to drive circuitry housing component 320, connector 441 to conduit 442, conduit 442 to connector 443, and connector 443 to flowmeter sensor 10, a certain number of threads must be engaged in order to meet explosion proof housing requirements. Connectors 441 and 443 include male and female threads of the prescribed number. Conduit 442 includes integral threads on each end. The threads on each end of conduit 442 must be twice the prescribed number to allow connectors 441 and 443 to be fully threaded onto conduit 442, then threaded into drive circuitry housing component 320 and flowmeter sensor 10 respectively, thereby maintaining sufficient threaded engagement at all points of threaded engagement. FIG. 5 illustrates a fully assembled view of the environmentally innocuous housing of FIG. 4.

The above describes preferred embodiments in accordance with the present invention. The preferred embodiments are provided for illustrative purposes. It is intended that the invention defined by the claims be provided the fullest interpretation allowed with full consideration to the Doctrine of Equivalents.

We claim:

1. A booster amplifier for a Coriolis flowmeter, said booster amplifier is adapted to receive drive signals from a flowmeter electronics and to extend amplified drive signals to a driver in a flowmeter sensor for inducing vibration of flow tubes of the flowmeter sensor, said booster amplifier being operable in an environment which may include a volatile material, said booster amplifier comprising:

an input adapted to receive drive signals from said flowmeter electronics;

barrier circuitry for receiving said drive signals from said input and transferring said drive signals;

drive circuitry for receiving said drive signals and converting said drive signals to amplified drive signals;

an output of said drive circuitry extends said amplified drive signals to said driver of said flowmeter sensor for inducing said flow tube vibration;

environmentally innocuous housing encasing said booster amplifier to prevent ignition of said volatile material within said operating environment;

offline switching power circuitry for receiving one of a plurality of standard AC voltages from an external power supply;

said offline switching power circuitry converts said one of said plurality of standard AC voltages to a single uniform DC voltage for powering said booster amplifier; and said barrier circuitry for preventing excessive power from being applied from said drive circuitry to said input.

2. The booster amplifier of claim 1, in which said offline switching power circuitry is adapted to convert said one of said plurality of standard AC voltages, said plurality of standard AC voltages having a range of 85 to 265 AC volts.

3. The booster amplifier of claim 1, in which said barrier circuitry comprises:

galvanic isolation device circuitry adapted to prevent said excessive power from being applied from said drive circuitry to said drive signals.

4. The booster amplifier of claim 1, in which said booster amplifier further includes:

phase shift circuitry that receives said drive signals, modifies the phase of said drive signals and extends said modified drive signal to said drive circuitry.

5. The booster amplifier of claim 4, in which said phase shift circuitry is adapted to modify the phase of said drive signals having a frequency in a range of 30 to 800 Hz.

6. The booster amplifier of claim 1, in which said environmentally innocuous housing comprises:

an interface housing component for housing said input receiving said drive signals from said flowmeter electronics;

a drive circuitry housing component connected to said interface housing component for housing said barrier circuitry, said drive circuitry and said offline switching power circuitry;

an amplified drive signal conduit component having first and second connectors and a conduit, said first connector connected to said drive circuitry housing component, said second connector connected to said flowmeter sensor and said conduit connecting said first and second connectors;

said interface housing component providing a flame path between said interface housing component and said drive circuitry housing component, preventing ignition of said volatile material within said operating environment;

said drive circuitry housing component providing explosion proof encasement of said barrier circuitry, said drive circuitry and said offline switching power circuitry, preventing ignition of said volatile material within said operating environment; and said amplified drive signal conduit component providing explosion proof encasement of said amplified drive signals from said drive circuitry housing component to said flowmeter sensor, preventing ignition of said volatile material within said operating environment.

7. The booster amplifier of claim 6, in which said amplified drive signal conduit component further comprises:

said first and second connectors having integral male and female threads;

said conduit having integral male threads on first and second ends;

said first connector in threaded engagement with said conduit and said drive circuitry housing component;

said second connector in threaded engagement with said conduit and said flowmeter sensor; and said amplified drive signal conduit component preventing ignition of said volatile material within said operating environment.

8. The booster amplifier of claim 6, in which said environmentally innocuous housing further comprises:

a non-drive signal housing component having first and second ends, said first end connected to said interface housing component and said second end connected to said flowmeter sensor; and said non-drive signal conduit component providing housing for additional signals received over a path from said flowmeter electronics which included said drive signals.

9. The booster amplifier of claim 6, in which said drive circuitry housing component further provides housing for said phase shift circuitry.

10. The booster amplifier of claim 1, in which said booster amplifier is integrally mounted to said flowmeter electronics.

11. The booster amplifier of claim 1, in which said booster amplifier is integrally mounted to said flowmeter sensor.

12. The booster amplifier of claim 1, in which said booster amplifier is integrally mounted to said flowmeter sensor and said flowmeter electronics.

13. A method of amplifying drive signals of a Coriolis flowmeter comprising the steps of:

receiving one of a plurality of standard AC voltages from an external power supply;

converting said one of said plurality of standard AC voltages to a single uniform DC voltage;

receiving drive signals from a flowmeter electronics;

amplifying said drive signals using said single uniform DC voltage to generate amplified drive signals;

applying said amplified drive signals to a driver of a flowmeter sensor;

housing a conductor carrying said amplified drive signals in a explosion proof encasement housing that prevents ignition of a volatile material within an operating environment of said flowmeter;

housing a conductor carrying said amplified drive signals applied to said driver in an explosion proof encasement housing that prevents ignition of said volatile material within said operating environment of said flowmeter;

housing a conductor carrying said drive signals received from said flowmeter electronics in a flame path containment housing that provides flame path containment between said housing for said conductor carrying amplified drive signal and said housing for said conductor carrying said drive signals preventing ignition of said volatile material within said operating environment of said flowmeter; and preventing power in excess of an intrinsically safe threshold from being applied from said amplified drive signals to said drive signals received from said flowmeter electronics.

* * * * *

UNITED STATES PATENT AND TRADEMARK OFFICE
CERTIFICATE OF CORRECTION

PATENT NO.   : 6,456,057 B1
DATED        : September 24, 2002
INVENTOR(S)  : William Randolph Weber, Kurtis Leroy McCormick and Michael John Zolock It is certified that error appears in the above-identified patent and that said Letters Patent is hereby corrected as shown below:

Column 8,
Line 48, replace "to drive signal 100A within interface housing component" with
-- to drive signal 110A within interface housing component --

Signed and Sealed this

Twenty-ninth Day of April, 2003

JAMES E. ROGAN
*Director of the United States Patent and Trademark Office*